US005835323A

United States Patent [19]

Mimata et al.

[11] Patent Number: 5,835,323

[45] Date of Patent: Nov. 10, 1998

[54] ELECTRICAL CONNECTOR WITH BREAKING CURRENT FOR LEAK

[75] Inventors: Yoshihisa Mimata, Higashiosaka; Nobumasa Miyaura, Kawachinagano, both of Japan

[73] Assignee: Hosiden Corporation, Yao, Japan

[21] Appl. No.: 819,632

[22] Filed: Mar. 17, 1997

[30] Foreign Application Priority Data

Mar. 19, 1996 [JP] Japan .................................... 8-090438
Jan. 8, 1997 [JP] Japan .................................... 9-013414

[51] Int. Cl.[6] ........................................ H02H 3/16

[52] U.S. Cl. ........................................ 361/93; 361/115

[58] Field of Search ........................................ 361/42–50, 57, 361/83, 102, 114, 115; 335/68, 202, 297, 299

[56] References Cited

U.S. PATENT DOCUMENTS 5,276,416 1/1994 Ozaki ........................................ 361/42
5,305,173 4/1994 Kakuta et al. ........................................ 361/45

*Primary Examiner*—Ronald W. Leja

*Attorney, Agent, or Firm*—Armstrong, Westerman, Hattori, McLeland & Naughton

[57] ABSTRACT

A connector with breaking of current for leak useful to implementation to a printed circuit board which is incorporated into a variety of electric appliances. It comprises a connection part for connecting a source and a load, a leak current detection sensor generally in a ring form which receives an extension of the connection part, a breaker part for breaking current between the source and the load in response to a leak detection, an assembly box which stores the leak detection sensor and the breaker part, and the leak detection part is fitted under the assembly box. The breaker part includes a coil to be excited in response to a leak current by the leak current detection part, and an actuator to displace in response to excitement of the coil. Therein the connection part includes a pair of movable strips and a pair of stationary strips each contactable to one of the movable strips, and either of the paired movable strips or the paired stationary strips, or one movable strip and one stationary strip other than contactable to the one movable strip are extended to run through the leak detection sensor, and the movable strips disconnect from the stationary ones in response to displacement of the actuator.

12 Claims, 17 Drawing Sheets

ELECTRICAL CONNECTOR WITH BREAKING CURRENT FOR LEAK

FIELD OF THE INVENTION

This invention relates to an electrical connector which instantaneously breaks a current in response to detection of a leak.

DESCRIPTION OF THE RELATED ART

The inventors of this application described the concept of the present invention in U.S. Pat. No. 5,305,173, granted Apr. 19, 1994. This prior art was mainly concerned with the connector with a breaking function in the form of a plug for manual use, wherein a certain volume or size is necessary as a product for convenience in handling by hand. Then, such product size is unsuitable for being incorporated into electrical products, that is, in such uses the downsizing is in strong demand. A recent trend is to reduce the size of every electrical appliance and this trend has required a smaller size for the connectors of the present concept for be feasible to implementation on printed circuit boards incorporated in a variety of electrical products. This invention is intended to match up to such demand in such industrial applications as electrical washers, heaters, air conditioners, for instance.

SUMMARY OF THE INVENTION

An object of present invention is to provide a connector with breaking of current for leak comprising: a connection means for connecting a source and a load, a leak current detection sensor generally in a ring form which receives an extension of the connection means, a breaker means for breaking current between the source and the load in response to a leak detection, and an assembly box which stores the leak detection sensor and the breaker means. The leak detection means is fitted under the assembly box, the breaker means includes a coil to be excited in response to a leak current detected by the leak current detection means, and an actuator will displace in response to excitement of the coil. The connection means includes a pair of movable strips and a pair of stationary strips contactable to one of the movable strips, and either of the paired movable strips or the paired stationary strips, or one movable strip and one stationary strip other than contactable to the movable one are extended to run through the leak detection sensor, and the movable strips disconnect from the stationary ones in response to displacement of the actuator.

In the following the invention will be described with reference to the appended drawings.

Figure 1:
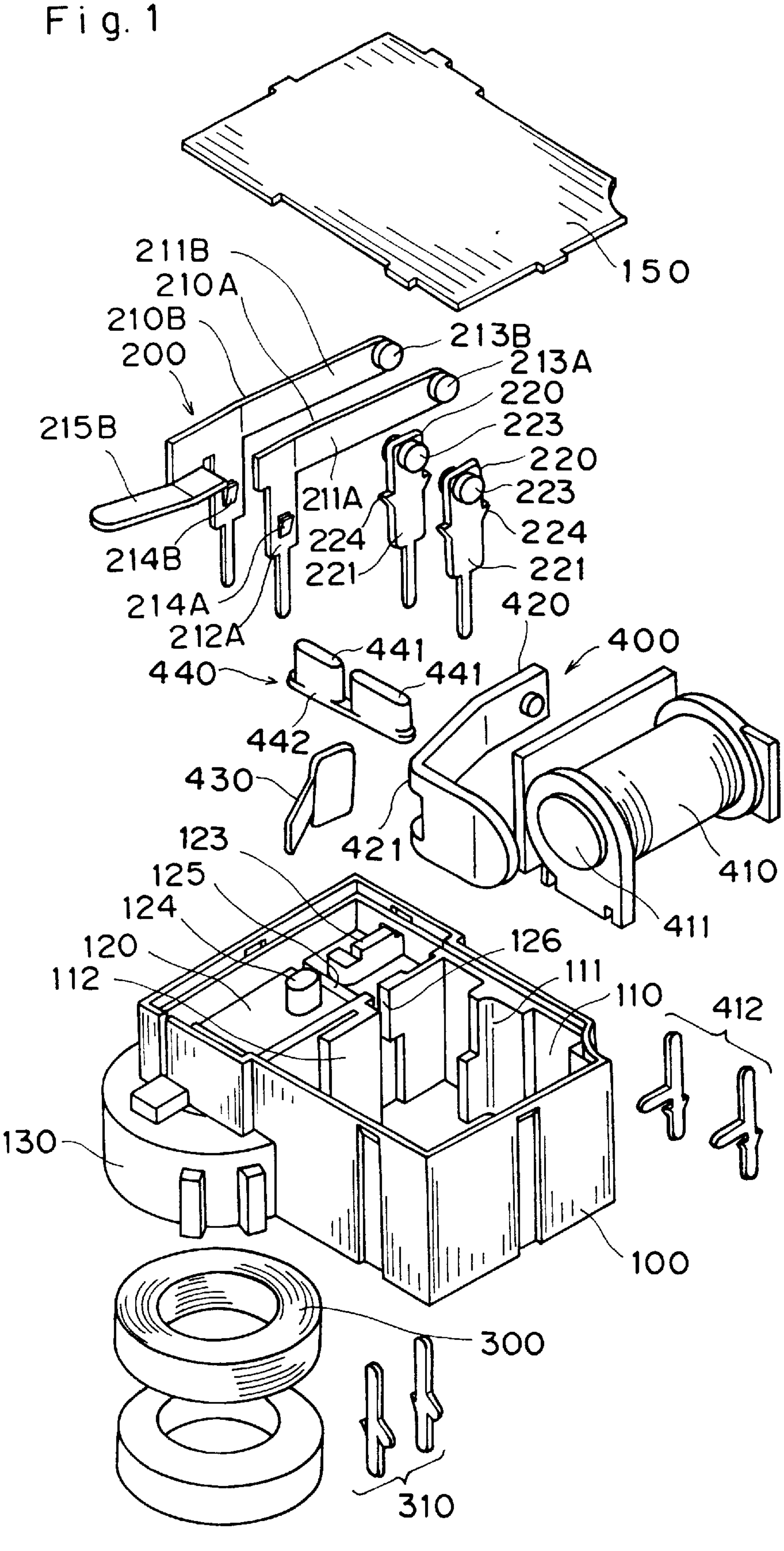
FIG. 1 shows an exploded perspective schematic view of parts for a first embodiment of this invention.

These drawings are presented for illustrating embodiments of the present invention and therefore these should not be construed as limiting the invention.

DETAILED DESCRIPTION OF THE INVENTION

Right in the following, the first embodiment will be described with reference to FIGS. 1 to 5.

The embodiment is an electrical connector with the function of instantaneous breaking of a current in response to detection of a leak, which comprises generally assembly box 100 and related parts numbered by numerals on the 100 order, connection means and related parts numbered by numerals on the 200 order, leak detection sensor means and related parts numbered by numerals on the 300 order, and breaker means and related parts numbered by numerals on the 400 order.

Figure 5:
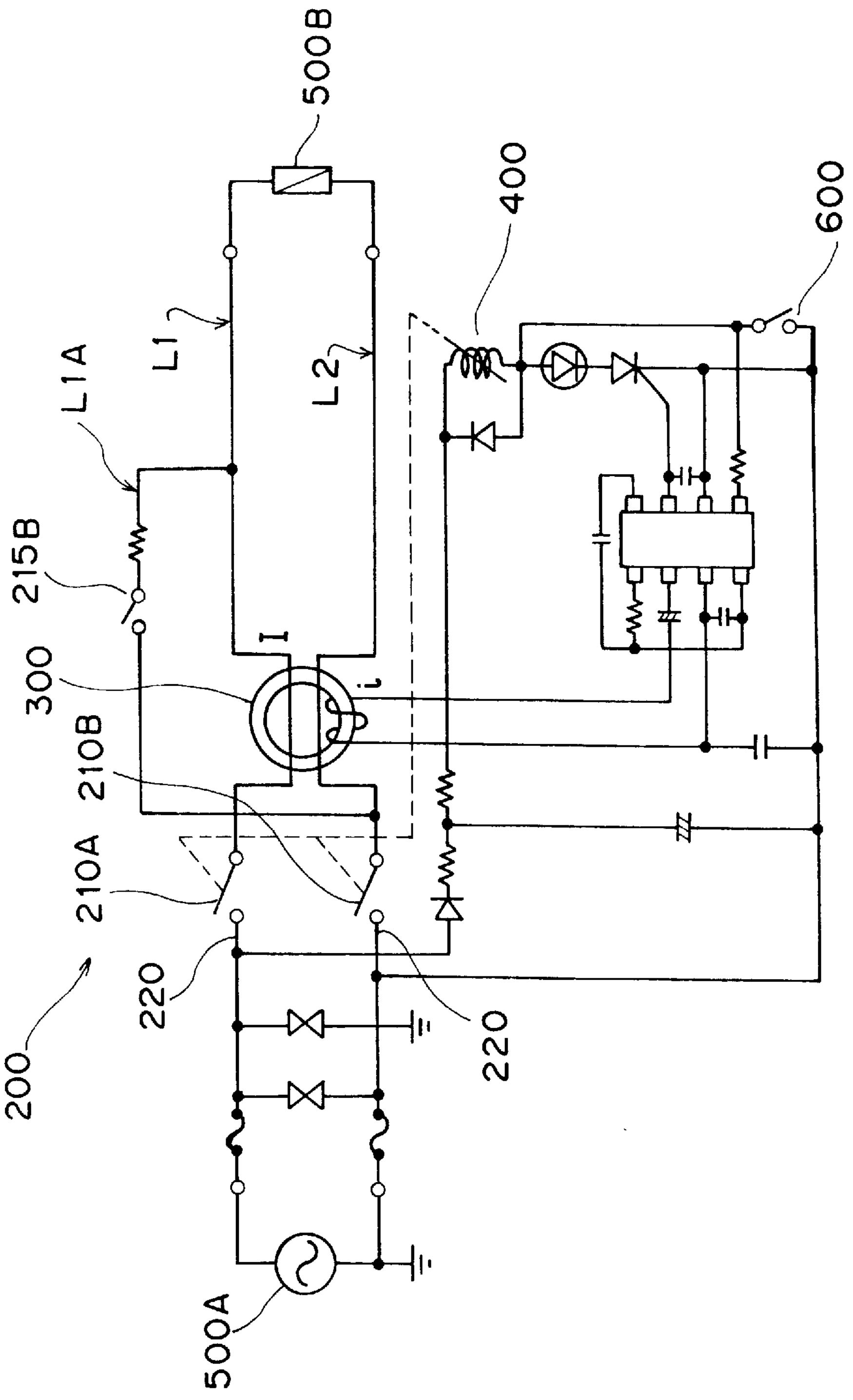
FIG. 5 shows an electrical circuit diagram for functioning the same connector shown in FIG. 1.

As shown by a circuit diagram in FIG. 5, connection means 200 and leak detection means 300 are incorporated into the circuit between source 500A and load 500B, wherein connection means 200 extends to run through leak detection means 300 shaped generally in a ring, and connection means 200 and leak detection means 300 are looped through breaker means 400, wherein, in response to a signal from leak detection means 300, breaker means 400 will act on connector means 200. These means are compactly stored in assembly box 100 which is, in other words, the connector assembly implemented on a printed circuit board, not shown in the drawings.

Herein, functions performed by this circuit will be briefly explained. Source 500A and load 500B are connected with two normal active lines L1, L2 through connection means 200 and leak detection means 300, and in normal operation, normal current I is balanced, but if L1 or L2 is grounded, current I becomes unbalanced and leak detection sensor 300 generates a current i which acts on breaker means 400 and in turn to connector means 200 which instantly disconnects lines L1, L2.

Connection means 200 comprises a pair of movable strips 210A, 210B, and a pair of stationary strips 220, 220. As shown in FIG. 1, Movable strip 210A is shaped generally in the shape of the letter L and is composed of longer strip part 211A extending laterally, at whose forward end movable contact 213A is mounted and of shorter strip part 212A extending downward from a joint with longer lateral strip 211A, and detent hook 214A is mounted on the shorter downward part for unremovable fixation to assembly box 100 as will appear later, wherein downward extension 212A has a needle-like fine forward end for penetrating into a through-hole provided in a printed circuit board, not shown.

On the other hand, other movable strip 210B shaped generally in the shape of the letter L has lateral part 211B joined with downward part 212B, and further test strip 215B which extends opposite to lateral part 211B from the joint. Similar to movable strip 210A, lateral part 211B is longer and downward part 212B is shorter, and at forward end of strip part 211B, movable contact 213B is mounted, and detent hook 214B is provided with downward part 212B for similar purpose as noted, and further a forward end thereof is made very fine for penetration into a through-hole provided in a printed circuit board, not shown.

Test strip 215B is intended to test if the connector assembly works normally or not, that is, to manually test if the assembly serves to instantaneously break the current in response to a leak detection. Accordingly, this test strip 215B extends outside assembly box 100 and is designed to move vertically. This vertical movability is different from trip direction of strip part 211B designed for lateral move, and as will be apparent later, lateral strip 213B and one stationary strip 220 are normally kept in contact, which contact is designed not to break by a push on test strip 215B. Therefore, a manual push on test strip 215B stays strip part 211B, but the push causes test strip 215B to contact a pin erected on a printed circuit board, not shown, on which the connector assembly is mounted as noted, wherein the pin contacted by the push has been connected to line L2. (see FIG. 5) Thereby line L1 is connected to line L2 through line LlA shown in FIG. 5 and this bypass connection makes a leak for test purposes.

A pair of stationary strips 220, 220 are each provided with stationary contacts 223, 223 at upward ends, and downward ends are made very fine to penetrate into holes provided in the printed circuit board, not shown. Further detent hooks 224, 224 are each provided on sides of the downward parts to fix the strips to assembly box 100. In FIG. 1, stationary strips 220, 220 are drawn as not taking fixed or arranged positions, but when set in place in assembly box 100, these strips are so positioned that their contacts 223, 223 will rightly face to contacts 213A, 213B of movable strips 210A, 210B, about which description will appear later.

Assembly box 100 is made from an insulative plastic and includes inside first compartment 110 for storing coil 410, part of breaker means 400, second compartment 120 for storing strips 210A, 210B, 220, 220, part of connection means, third compartment 130 for storing sensor 300 for leak detection and this compartment 130 is designed, as FIG. 1 shows, to be generally under second compartment 120 to face downward, wherein these compartments are provided by unitary molding of box 100. In use this box is closed with lid 150 after devices of connection means 200 and breaker means 400 have been stored inside.

In first compartment 110 for coil 410, actuator 420 and leaf spring or elastic plate 430, part of the breaker means, are stored, wherein coil 410 is fixed as placed, but actuator 420 and leaf spring 430 are set to have some clearance space.

Specifically, inside first compartment 110 for coil 410, convex wall 111 is provided to fit a corner of coil 410 and there is a sub-compartment next to wall 111 and in between a partition wall for second compartment 120. Therein actuator 420 is placed and leaf spring 430 is embraced by hook wall 112 which extends from the partition wall.

Figure 2:
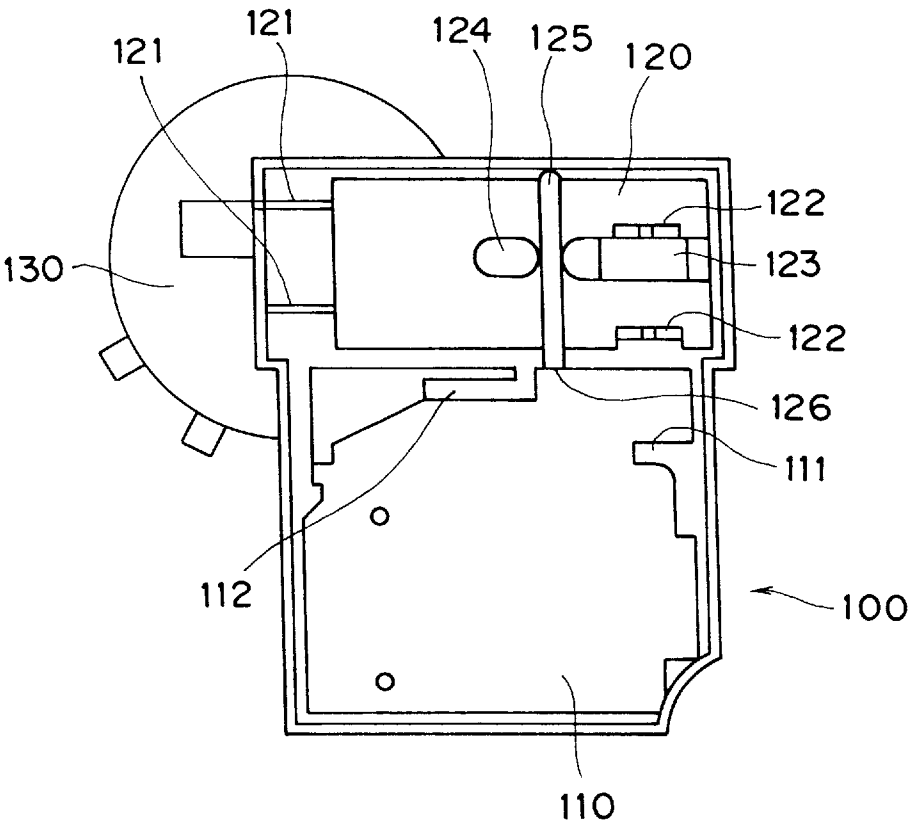
FIG. 2 shows a schematic plan view of an assembly box useful to assemble the same connector embodiment shown in FIG. 1.

Second compartment 120 for the strips is designed to have a depth suitable for storing paired lateral parts 211A, 211B of movable strips 210A, 210B and, as shown in FIG. 2, two pairs of through holes are provided. One pair of holes 121, 121 are for penetration of downward parts 212A, 212B of movable strips 210A, 210B and are communicated to a center of third compartment 130 for sensor 300. The other pair of holes 122, 122 are for penetration of downward parts 221, 221 of stationary strips 220, 220. The penetration serves to hold or fix the strips involved to the bottom wall of second compartment 120 for the strips, in turn to assembly box 100.

Further, in second compartment 120, barrier wall 123 is provided to provide separation between two stationary strips 220, 220 in order to hinder unexpected contacts between these strips when such strips are set in place. In addition, control stand 124 is provided to leave a gap in between to an inside end of barrier wall 123, and the gap is molded to form ditch guideway 125 which will slidably receive slider 440, part of breaker means 400, about which description will appear later, and cut 126 is provided in the wall between first compartment 110 and second one 120 for communication to ditch 125.

Figure 3:
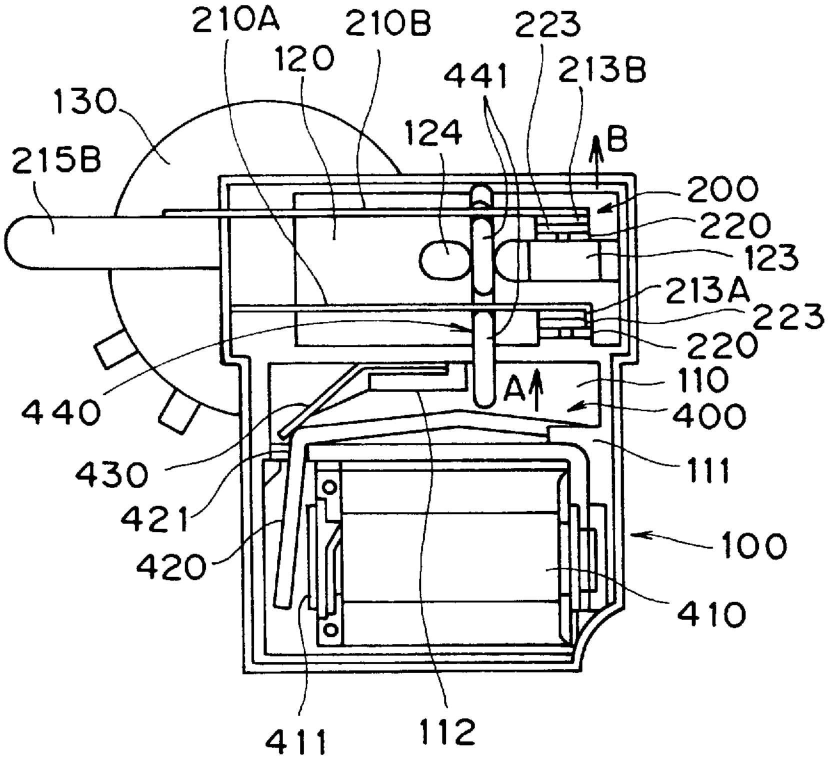
FIG. 3 shows a schematic plan view of the same assembled connector embodiment in such state that the connector is serving the current connection.
Figure 4:
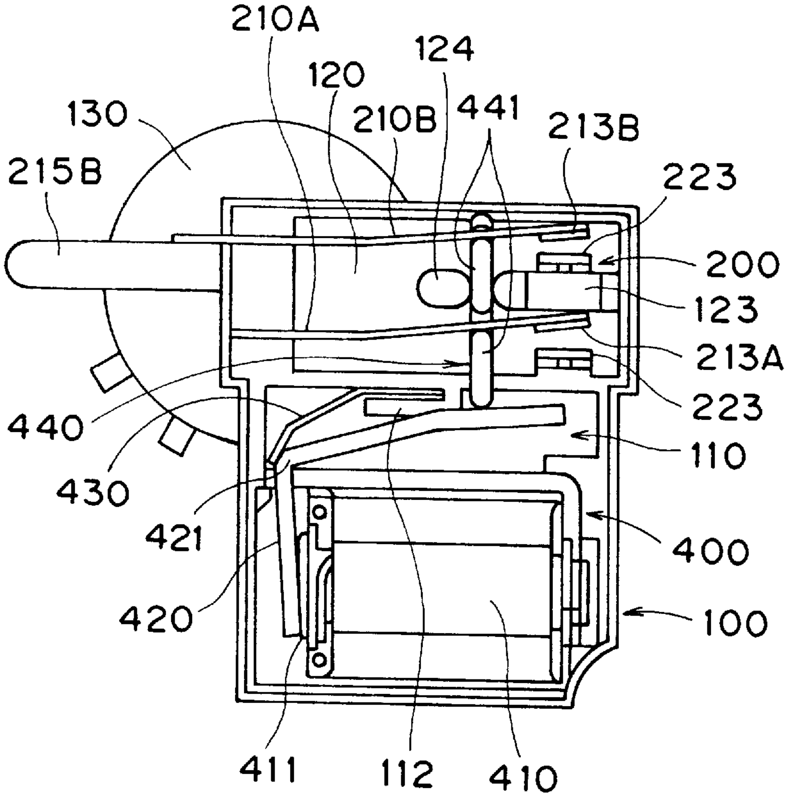
FIG. 4 shows a schematic plan view of the same assembled connector embodiment in such state that the connector has broken the current.

When setting movable strips 210A, 210B in second compartment 120, downward parts 212A, 212B are inserted into through-hole 121, 121 preferably keeping strip 212B having test strip 215B at outer position as is shown in FIGS. 3 and 4. Then these two strips 210A, 210B are rendered to hold movable contacts 213A, 213B at a face-to-face position with barrier wall 123 in between at a proximity to through holes 122, 122 in plan view. In turn, stationary strips 220, 220 are set by inserting their downward parts 221, 221 into through-holes 122, 122, and thereby similar to the preceding act, these two strips are rendered to hold stationary contacts 223, 223 at face-to-face position with barrier wall 123 in between. At this stage, if no external force acts on movable strips 210A, 210B, movable contacts 213A, 213B are in contact with stationary contacts 223, 223. As is understood, the movable strip 210A is contactable to the stationary strip 220 located forward, but uncontactable to the stationary strip 220 located backward. Also the movable strip 210B is contactable to the stationary strip 220 located backward, but uncontactable to the stationary strip 220 located forward.

Third compartment 130 for storing leak sensor 300 is provided under box 100 so that the center of sensor 300 in place comes to be right under one corner of compartment for strips 120.

Assembly box 100 has such size and wall thickness designed to meet the volume of coil 410 of breaker means 400, and second compartment 120 for storing the strips need not such depth and is made shallow, under which compartment third compartment 130 for storing sensor 300 is provided. Thus assembly box 100 is as a whole is made compact in size.

Leak detection means 300 is a current sensor to detect magnetism caused by a leak current and is formed to be ring. Upon detecting such leak current, sensor 300 transmits a signal according to the circuit shown in FIG. 5.

Breaker means 400 includes coil 410 which will excite, upon receiving the signal from sensor 300, and actuator 420 which will displace according to the excitement of coil 410, and elastic plate 430 which will restrain any play move of actuator 420, and slider 440 which will transfer the displacement by actuator 420 to movable strips 210A, 210B.

Coil 410 of breaker means 400 is designed to be excited by leak current and to attract actuator 420.

Actuator 420 is a magnetic metal plate flexed generally in the shape of a letter L, of which a longer part is placed between coil 410 stored in first compartment 110 and box wall 100, and of which a shorter part is placed to face to iron core 411 of coil 410 so that actuator 420 will displace or turn about flex point 421 as center or pivot.

Elastic plate 430 is a leaf spring supported by hook wall 112 and abutted or pressed on flex point 421 to restrain any excess move of actuator 420.

Then, slider 440 is made from an insulative plastic and is composed of base 442 and two stand plungers 441, 441 lined on base 442. When slider 440 is engaged at its base 442 into ditch 125 and set in place, an end of slider 440 covers over cut 126 and projects into first compartment 110 to be close to longer part of L letter shaped actuator 420, and the other end of slider 440 is positioned close to the dead end of ditch 125, and two longer parts 211A, 211B of movable strips 210A, 210B are laid to cross slider 440. Specifically, lateral part 211A of strip 210A extends through a gap between two stand plungers 441, 441, and lateral part 211B of strip 210B extends through a gap between box wall 100 and stand plunger 441 located far from coil 410.

In FIG. 1, numeral 310 indicates a pair of lead ends of leak detection sensor 300, and 412 indicates a pair of lead ends of coil 410.

Operations of the connector assembly thus described will be explained.

First, it is assumed that the subject connector assembly is connected to the circuit as shown in FIG. 5 by fitting movable strips 210A, 210B; stationary strips 220, 220; lead ends 310, 412 to a printed circuit board, not shown.

Source 500A is connected to stationary strips 220, 220, and load 500B is connected to movable strips 210A, 210B. While no leak -occurs, coil 410 is not excited and then actuator 420 is not attracted to iron core 411 of coil 410. That is shown in FIG. 3, wherein contacts 213A, 213B of movable strips 210A, 210B are in contact with contacts 223, 223 of stationary strips 220, 220. Thus source 500A supplies power to load 500B normally.

If a leak somehow occurs, leak detection sensor 300 detects magnetism appearing around downward extension of connection means 200 and thereby coil 410 is excited. That is, a leak causes a difference in currents I flowing in two lines L1, L2 (see FIG. 5) which run through the center of sensor 300 (Normally the same two currents I cancel each other and as a result no magnetism appears around the sensor.) In turn, the magnetism which appears around sensor 300 causes a current i and through amplification coil 410 is excited.

Excited coil 410 attracts actuator 420 which thereby displaces to the arrow mark A in FIG. 3 with flexed point 421 as center. In turn, slider 440 is pushed by actuator 420 so that strip parts 211A, 211B of movable strips 210A, 210B are pushed by slider stand plungers 441, 441 to the arrow mark B in FIG. 3 and moved. This move breaks contacts between movable strip contacts 213A, 213B and stationary strip contacts 223, 223. Thus, source 500A and load 500B are disconnected.

If a cause of the leak is eliminated, reset switch 600 (see FIG. 5) is operated, the connection between source 500A and load 500B is recovered. That is, after the leak has ended, coil 410 will not be excited and actuator 420 is slid back by resilience of movable strip parts 211A, 211B and in turn such strip parts come back to make contacts with stationary strips 220, 220 as previous. Then source 500A and load 500B are again connected.

Assuming if reset switch 600 is operated before the leak ends or leak is still on, coil 410 keeps the excitement and movable strip parts 211A, 211B do not come back as previous. Thus source 500A and load 500B are not connected.

Turning to operations of test strip 215B to test if the connector assembly works normally for a leak, when test strip 215B is contacted to the pin as explained before, the current which will flow line L1 is shunted to line L2 (see FIG. 5) making a bypass route L1*a* which does not pass sensor 300 located in the connection between source 500A and load 500B, thus this is equivalent to a leak. If breaker means 400 and connection means 200 function normally, a push on test strip 2158 will break the connection simultaneously between source 500A and load 500B and the breaking occurs for the duration of pushing. Therefore recovery will be recognized soon by stopping the push. Such a helpful test is feasible by simple operation. The embodiment shown so far is equipped with test strip 215B on movable strip 210B, but this equipment is optional and the invention is not limited to such.

The embodiment described with reference to FIGS. 1 to 5 employs movable strips 210A, 210B extending through the sensor 300, but the invention is not limited to this embodiment.

Figure 6:
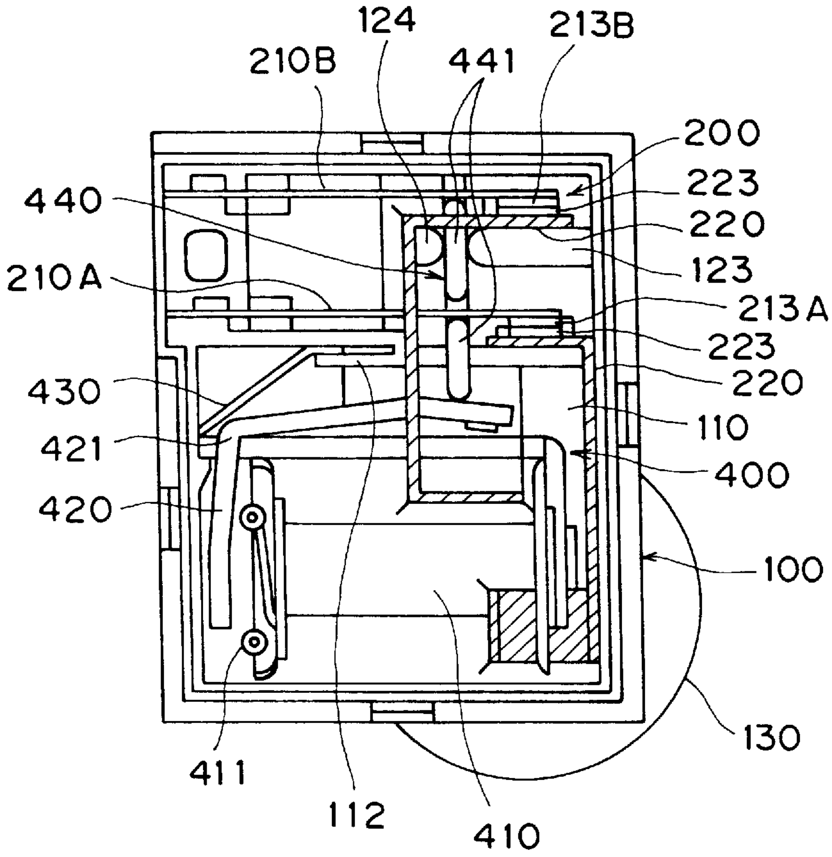
FIG. 6 shows a schematic plan view of another second assembled connector embodiment in such state that the connector is serving the current connection.
Figure 7:
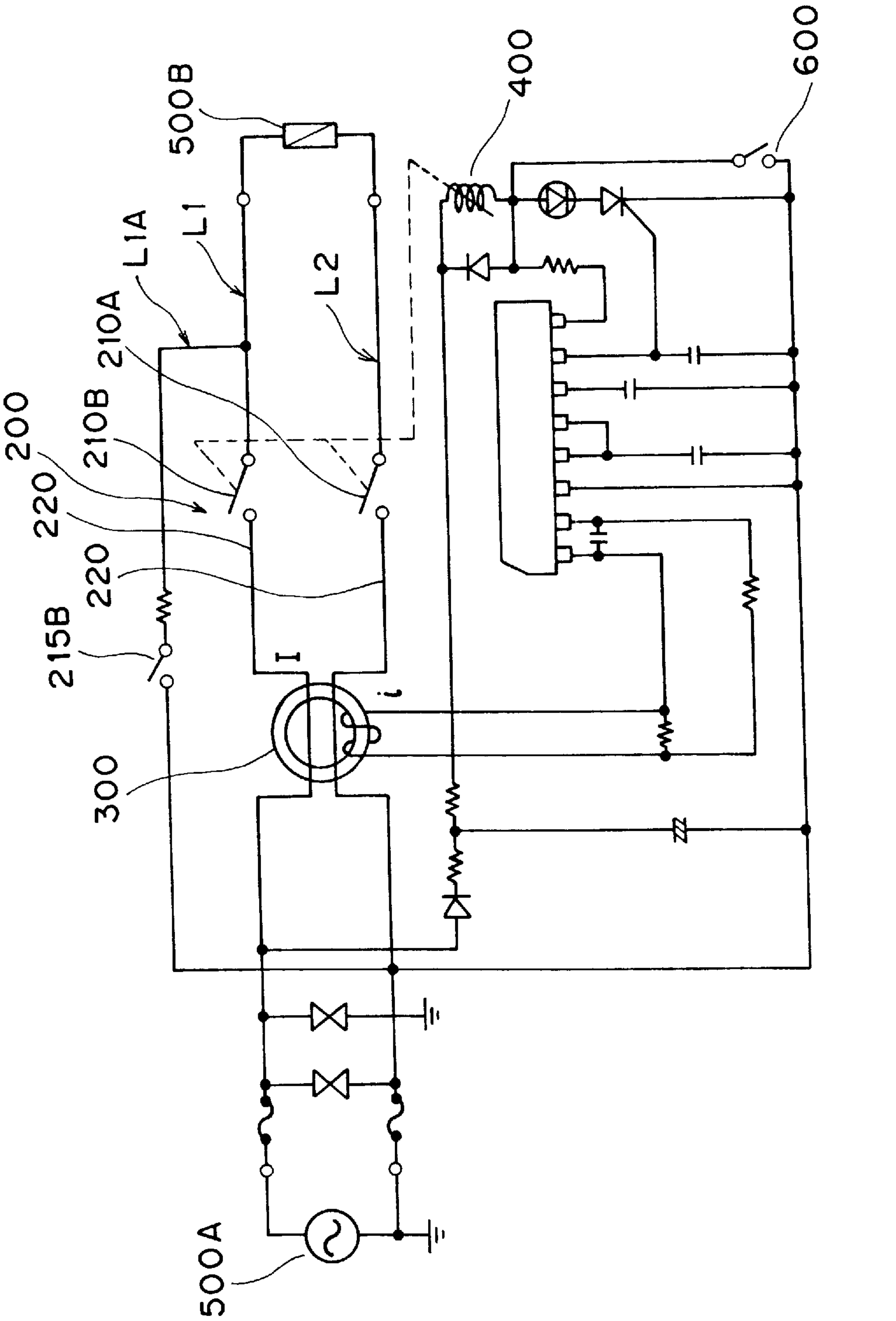
FIG. 7 shows an electrical circuit diagram for the same second connector shown in FIG. 6.

As shown in FIGS. 6 and 7, stationary strips 220, 220 may be arranged to extend or to run through leak detection sensor 300. In this embodiment, sensor 300 is located under coil 410, that is, third compartment 130 is mounted under a corner of first compartment 110.

Therein, stationary strips 220, 220 (shaded in FIG. 6) are figured generally in the shape of the letter L and generally in the angular shape of the letter C. Both are extended from where movable contacts 213A, 213B of movable strips 210A, 210B are located to where sensor 300 is located by penetration to the sensor 300.

This embodiment differs from the preceding one in the point that stationary strips 220, 220 are extended to reach sensor 300 and in the accompanying points of the location of sensor 300 and also the configuration of stationary strips as noted, but otherwise, for instance, main structures and their functions are much the same. This embodiment does not include a test strip as noted, but inclusion of such is obviously allowable.

Further, it is also allowable to arrange one movable strip 210A and one stationary strip 220 which are not contacted each other, to lead to penetrate sensor 300, or to arrange the other movable strip 210B and the other stationary strip 220 which are not contacted each other to lead to penetrate sensor 300. Choice of which strips in connection means 200 are extended to penetrate sensor 300, depends upon a shape of assembly box 100 or location of sensor 300 or other factors and the choice should be determined most suitably.

Figure 8:
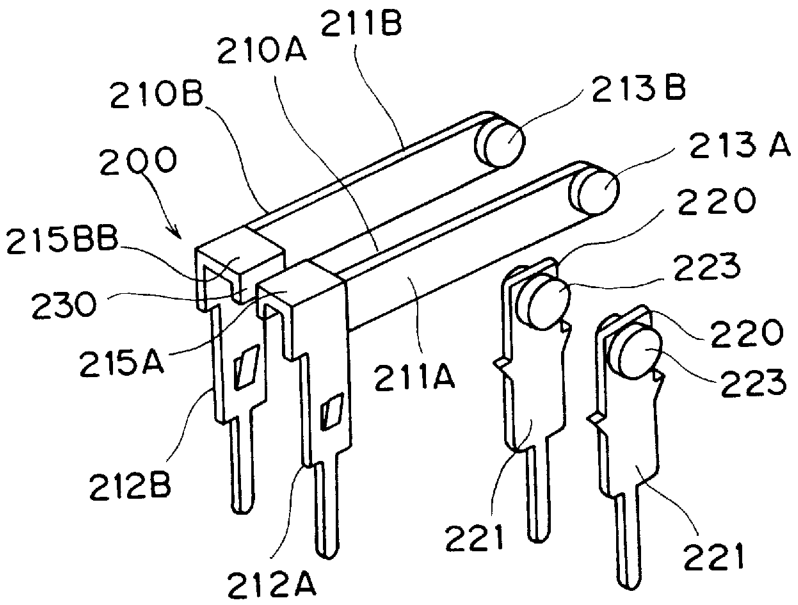
FIG. 8 shows a schematic perspective view of a connection means in another third connector embodiment.
Figure 9:
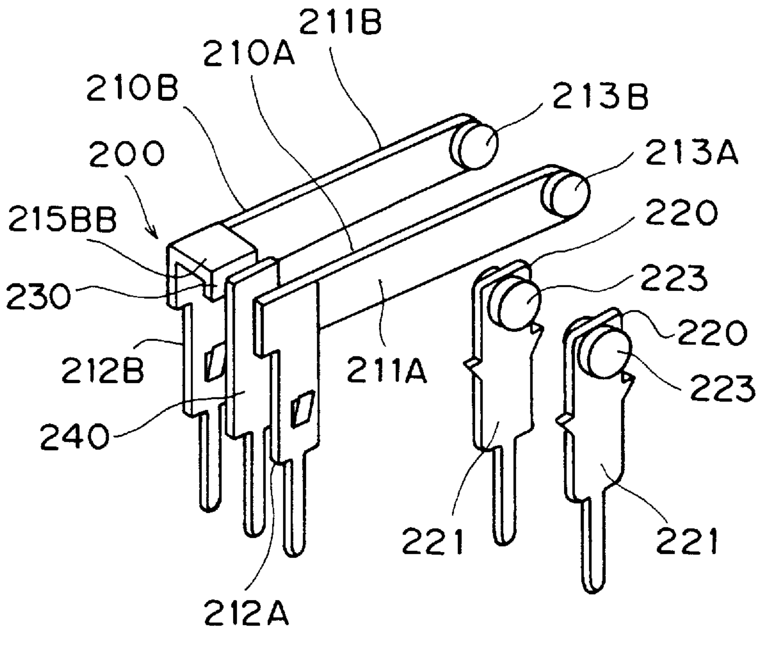
FIG. 9 shows a schematic perspective view of a connection means in another fourth connector embodiment.

In connection means 200, as a shown in FIGS. 8 and 9, it is allowable to provide a discharge gap 230 with the strips as a countermeasure against possible lightening surge or noise. In FIG. 8 embodiment, a pair of parallel strips 210A, 210B are each provided unitarily with an inward projection 215A, 215BB in inverse L letter shape so as to form opposite facing at each joint of lateral part and downward part, and two movable strips 210A, 210B are located to leave a slight gap 230 between two inward projections 215A, 215BB.

In the embodiment shown in FIG. 9, grounding strip 240 is erected between two movable strips 210A, 210B, in parallel with two downward parts 212A, 212B, and one downward part 212B is provided unitarily with inward projection 215BB in the shape of a inverse letter L with a slight gap in between to grounding strip 240. Thus, discharge gap 230 is formed between two oppositely facing by grounding strip 240 and forward end of projection 215BB from strip 210B.

In either embodiment, 0.5 mm of gap width provided with discharge gap 230 would cause discharges up to about 1800 volts. and 0.1 mm would cause discharge of about 220 volts. Such discharge ability will serve as protection against lighting surge or noise. Conventionally, such a countermeasure has been practiced by mounting barristor with a printed circuit board, but the innovation noted herein will dispense with barrister, which contributes to a decrease in part numbers, and in turn a reduction in size of the product connector assembly or cost saving.

Further, FIGS. 8 and 9 embodiments set up discharge gap 230 on movable strips 210A, 210B, but it is allowable to set up the same on stationary strips 220, 220. In these embodiments, test strip 215B is not included, but inclusion of such is allowable. In addition, allowable is the joint set up of one structure utilizing a strip itself as in FIG. 8 and the other structure utilizing another strip named earthing strip 240 as in FIG. 9.

Turning to a fifth embodiment shown in FIGS. 10 to 17, this embodiment includes a sensor to detect overcurrent 700 as compared with the embodiment shown in FIGS. 1 to 5. Also, connection means 200 and assembly box 100 are structured differently from those in FIGS. 1 to 5. Connection means 200 and assembly box 100 of this embodiment basically agree to those shown in FIGS. 6 and 7.

Figure 10:
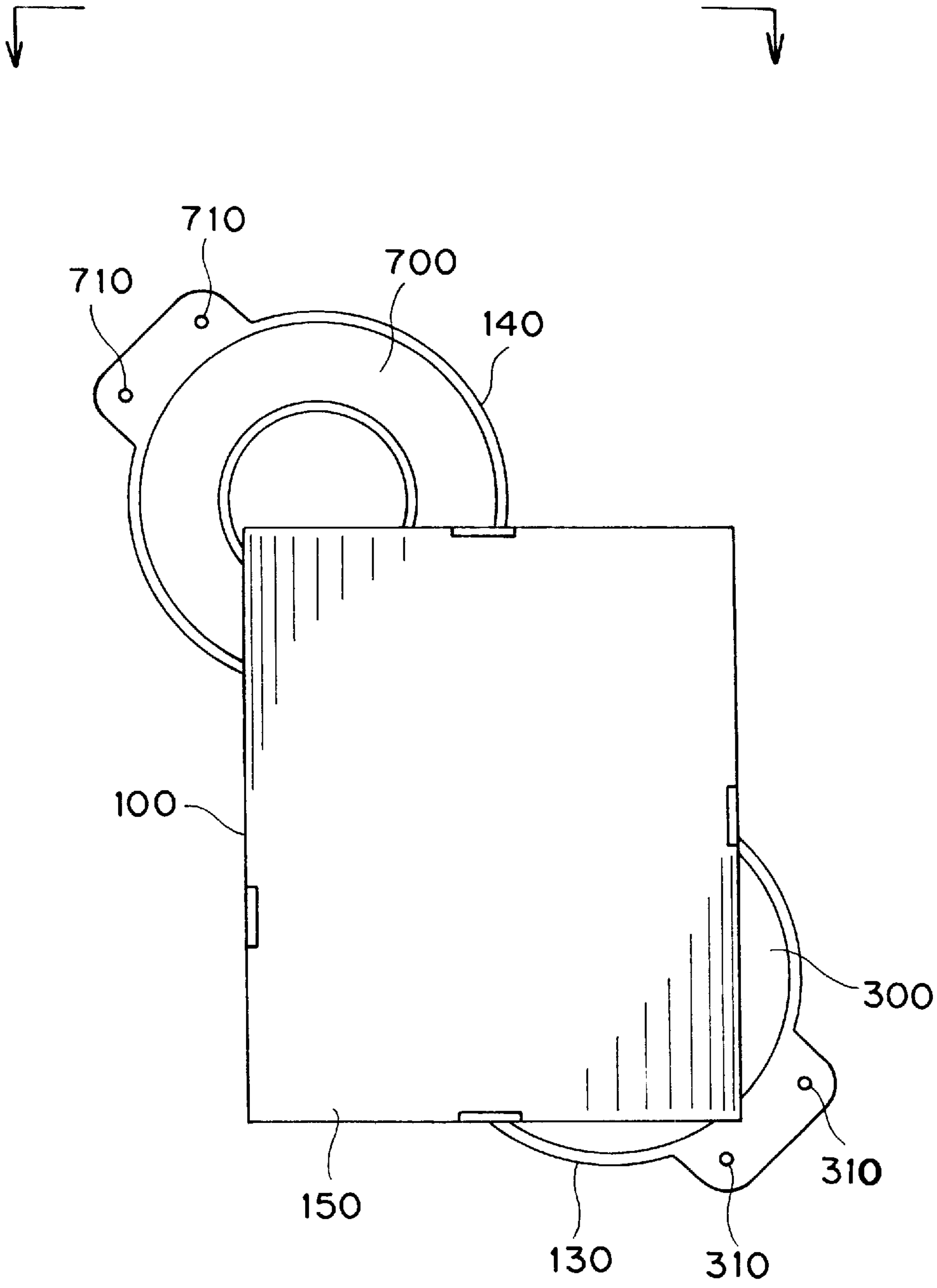
FIG. 10 shows a schematic plan view of another fifth connector embodiment.
Figure 11:
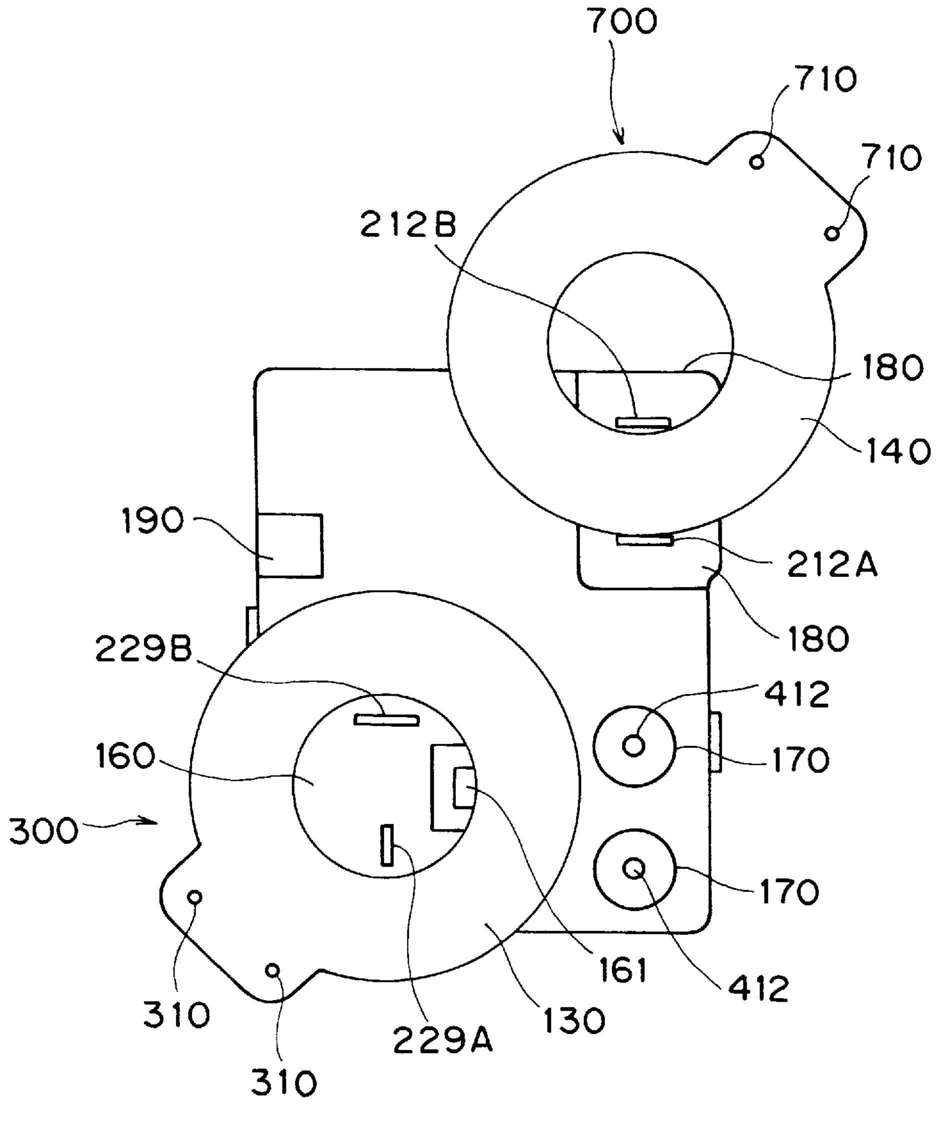
FIG. 11 shows a schematic bottom view of the same fifth connector embodiment.
Figure 12:
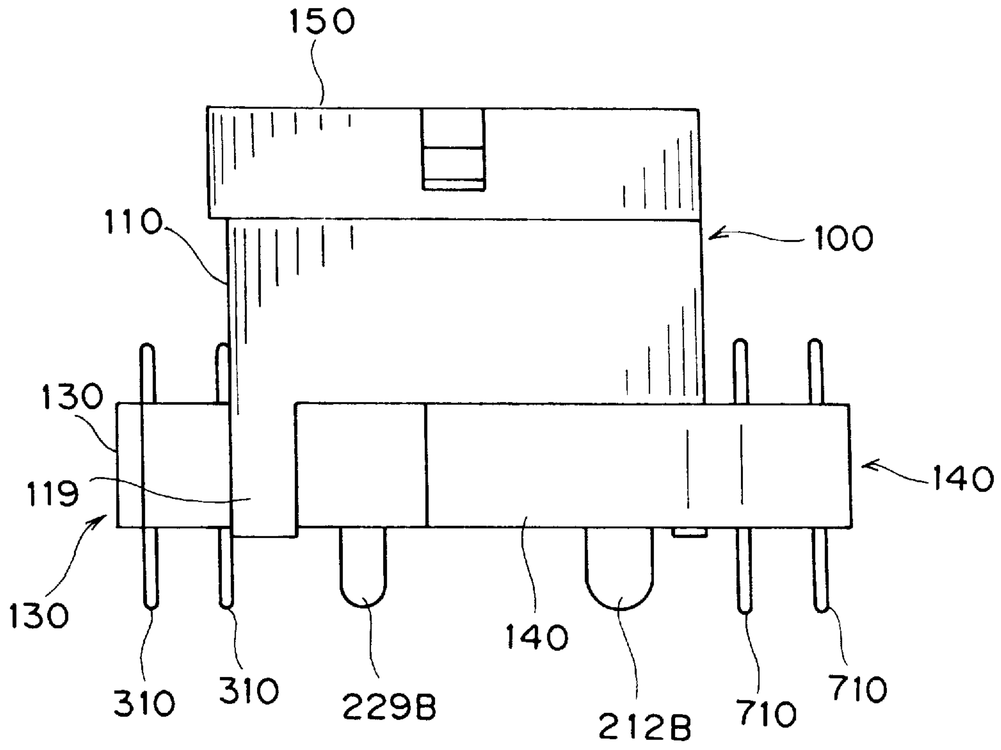
FIG. 12 shows a schematic back view of the same fifth connector embodiment as viewed along view lines shown in FIG. 10.

As shown in FIGS. 10 to 12, assembly box 100 of this embodiment stores connection means 200 and breaker means 400 (see FIG. 6), and mounts leak detection sensor 300 and overcurrent sensor 700 on the bottom, wherein the plan view by FIG. 10 shows the state with lid 150 covered.

Figure 13:
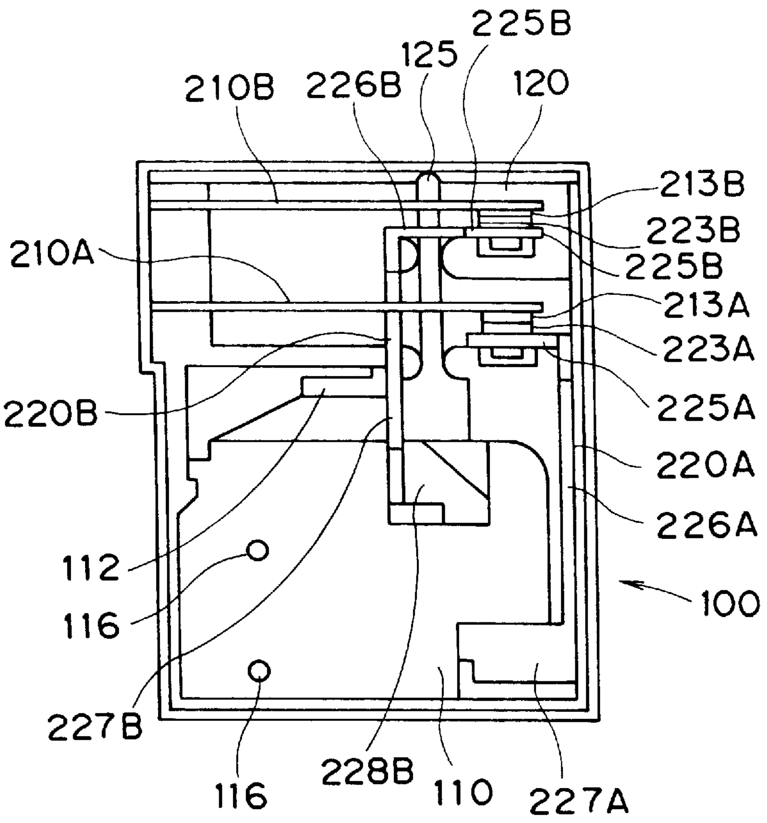
FIG. 13 shows a schematic plan view of the same fifth connector embodiment to describe a structural arrangement inside the assembly box.
Figure 14:
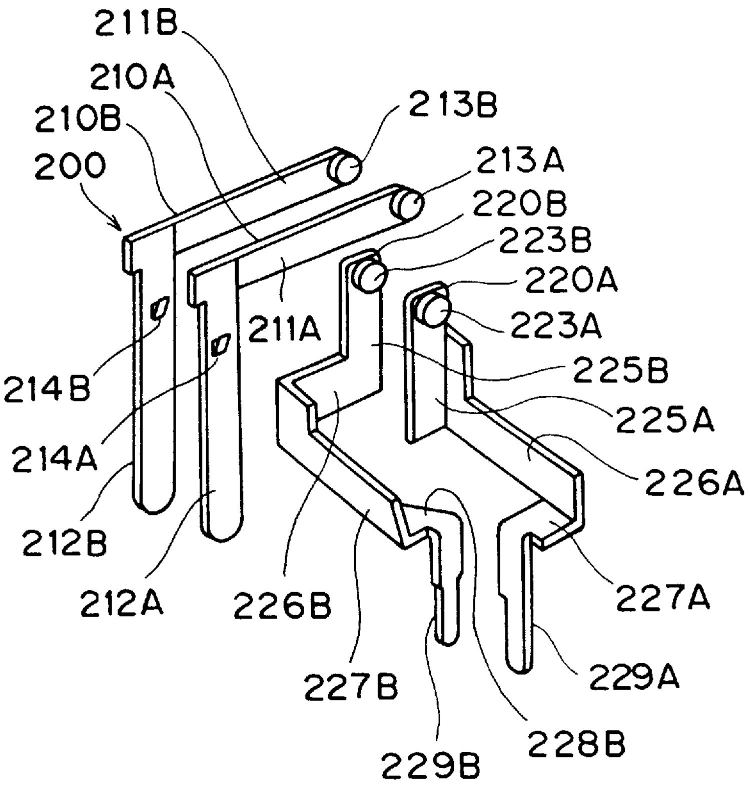
FIG. 14 shows a schematic perspective view of the same fifth embodiment to describe a connection means.

As for connection means 200 shown in FIGS. 13 and 14, a pair of movable strips 210A, 210B and mating pair of stationary strips 220A, 220B are included. Movable strips 210A, 210B are generally configured in the same inverse letter “L” shape and set in box 100 in parallel relationship. These movable strips 210A, 210B are much the same as those shown in FIGS. 1 to 5 except for test strip 215B.

On the other hand, stationary strips 220A, 220B are different from those shown in FIGS. 1 to 5, and one strip has a figuration different from other. That is, one stationary strip 220A comprises (mentioning from top to bottom) first vertical part 225A provided with contact 223A upper most, and first lateral part 226A connected from a forward end of first vertical part 225A to next lateral part, that is, second lateral part 227A, and then to a second vertical part 229A. The other stationary strip 220B comprises (mentioning from top to bottom) first vertical part 225B provided with contact 223B upper most, and first lateral part 226B connected from a forward end of first vertical part 225B to next lateral part, that is, second lateral part 227B, and then angled to third lateral part 228B and second vertical part 229B. Second vertical parts 229A, 229B are assumed to penetrate the bottom plate of box 100 and to extend through a through-hole in a printed circuit board.

The connection means noted above is the same as that 200 shown in FIGS. 6 and 7, and FIG. 13 does not include breaker means 400, but if incorporated, its appearance would be like FIG. 6.

Figure 15:
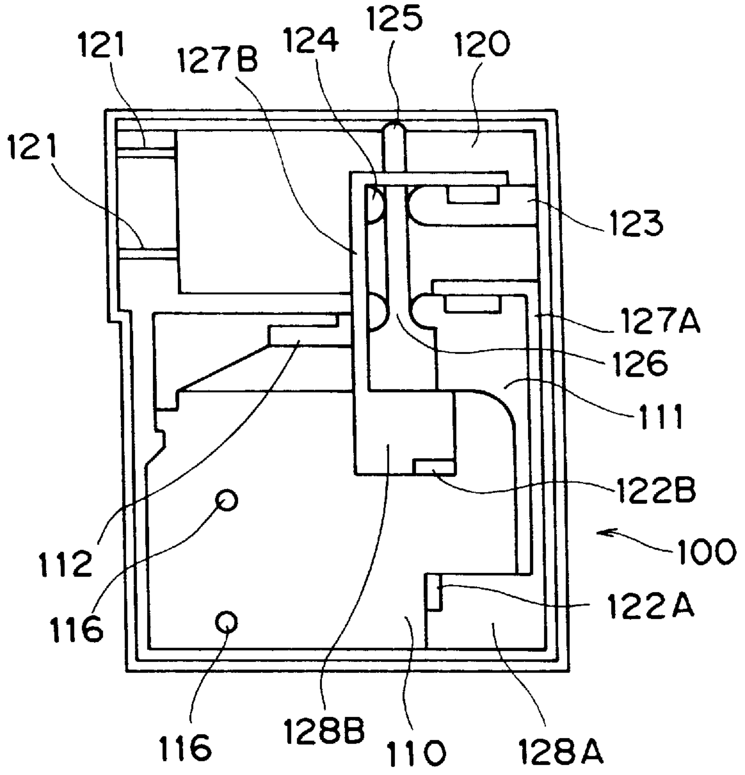
FIG. 15 shows a schematic plan view of the same fifth embodiment to describe the assembly box, wherein attached compartments are omitted.
Figure 16:
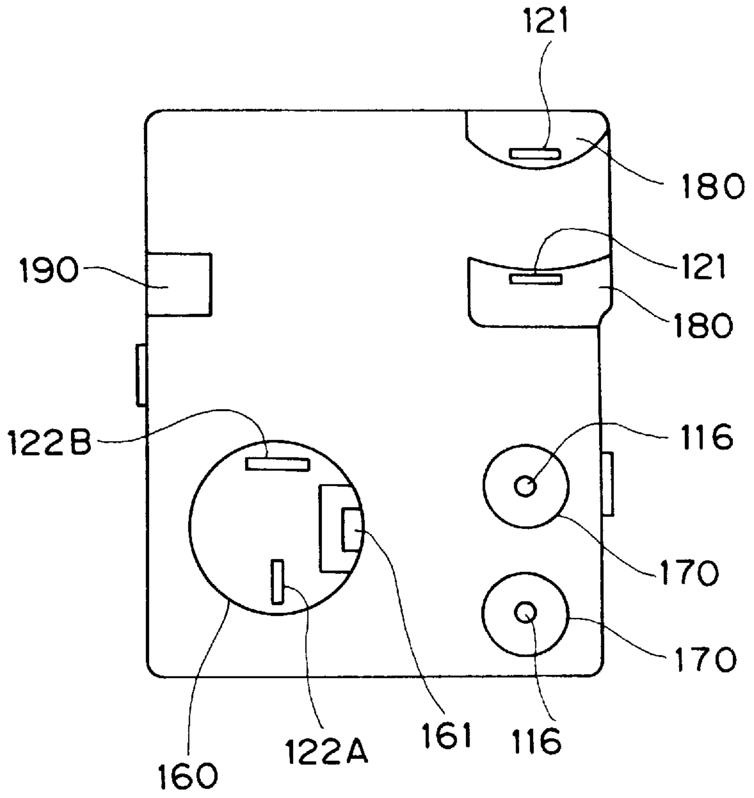
FIG. 16 shows a schematic bottom view of the assembly box of the same fifth embodiment, wherein attached compartments are omitted.
Figure 17:
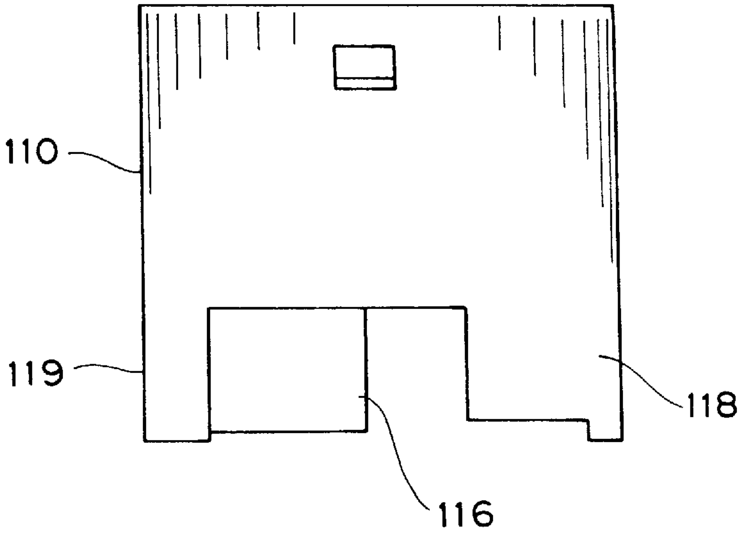
FIG. 17 shows a schematic back view of the assembly box of the same fifth embodiment, wherein attached compartments are omitted.

As shown in FIGS. 15 and 16, the interior of assembly box 100 is provided with first compartment 110 for storing coil 410 of breaker means 400, and second compartment 120 for storing movable strips 210A, 210B and stationary strips 220A, 220B. On the bottom plate of the second compartment 120, through-holes 121, 121 are provided for receiving downward parts 212A, 212B of movable strips 210A, 210B. On the bottom plate covering second compartment 120 and first compartment 110, there are L letter shaped slot 127A for receiving first vertical part 225A and first lateral part 226A of stationary strip 220A, and another L letter shaped slot 127B for receiving first vertical part 225B, first lateral part 226B and second lateral part 227B of stationary strip 220B. On the bottom plate of first compartment 110, there are slot 128A continued from slot 127A for receiving second lateral part 227A of stationary strip 220A, and slot 128B continued from slot 127B for receiving third lateral part 228B of stationary strip 220B, and thereon holes 122A, 122B are provided for receiving final vertical strip parts 229A, 229B of stationary strips 220A, 220B and then downward under the box bottom.

In arranging the devices inside box 100, when movable strips 210A, 210B and stationary strips 220A, 220B are stored in place, contacts 213A, 213B of movable strips 210A, 210B are set in resilient contact with contacts 223A, 223B of stationary strips 220A, 220B in the same way as in the embodiments shown in FIGS. 1 to 5 and FIGS. 6 and 7. See FIG. 13. Downward parts 212A, 212B of movable strips 210A, 210B are set projecting under second compartment 120 of box 100, and second vertical parts 229A, 229B of stationary strips 220A, 220B are set projecting under first compartment 110 of box 100 in the same way as in the embodiment shown in FIGS. 6 and 7.

On the underside of the bottom of box 100, cylindrical protrusions 160, 170, 170 are unitarily formed at locations corresponding to first compartment 110, and square protrusions 180, 180, 190 are unitarily formed at locations corresponding to second compartment 120. On protrusion 160 at the location corresponding to first compartment 110, through holes 122A, 122B are provided to let second vertical parts 229A, 229B penetrate downward. On protrusions 170, 170, through holes 116, 116 are provided to let lead end 412, 412 of coil 410 penetrate downward. On square protrusions 180, 180 at the locations corresponding to second compartment 120, through holes 121, 121 are provided to let downward parts 212A, 212B of movable strips 210A, 210B penetrate downward. Therein another protrusion 190 is for support of the box.

Outside protrusion 160 wherein second vertical parts 229A, 229B of stationary strips 220A, 220B are extending, leak detection sensor 300 in a ring form is held by snap nail 161 mounted on protrusion 160, and inbetween protrusions 180, 180 wherein downward parts 212A, 212B of movable strips 210A, 210B are extending, overcurrent detection sensor 700 is held by snap nail, not shown. Thereby, second vertical parts 229A, 229B of stationary strips 220A, 220B are allowed to penetrate at a location inside leak detection sensor 300, and one downward part 212B of movable strips 210A, 210B is allowed to penetrate at a location inside overcurrent sensor 700.

Therein, compartments 130, 140 for storing or housing leak detection sensor 300 and overcurrent detection sensor 700 fitted underside of the box bottom are ring caps which will be mounted from under, and these caps are not products which have been molded unitarily with box 100.

In the embodiment shown in FIGS. 10 to 17, in the same way as in the embodiments shown in FIGS. 1 to 5 and FIGS. 6 and 7, a leak current is first detected by leak detection sensor 300 and passed on to breaker means 400 and connection means 200 wherein the contacts formed by movable contacts 213A, 213B and stationary contacts 223A, 223B are broken to disconnect source 500A from load 500B. That is, a leak causes the current (I) flowing through the two lines running inside sensor 300 to be unbalanced which generates the current (i) at sensor 300 to act on breaker means 400. In addition, an overcurrent is detected by overcurrent sensor 700 and passed on to breaker means 400 and then connection means 200 wherein the same breaking action takes place as noted. Therein assumed is that such an overcurrent detection circuit has been added that one of the two movable strips or one of the two stationary strips extends through overcurrent detection sensor 700, and should an overcurrent which exceeds a preset current amount be detected by overcurrent sensor 700, breaker means 400 will act.

As described so far, the present embodiment includes breaking for a leak as well as breaking for an overcurrent, wherein leak sensor 300 and overcurrent sensor 700 are fitted under assembly box 100 and connection means 200 extends through inside thereof. Such assembly or arrangement contributes to lessen the number of parts and reduction in size. 710, 710 indicate lead ends of extensions from fourth compartment 140. See FIGS. 11 and 12. As for 310, 310, see FIG. 1.

In the arrangement described above, two stationary strips 220A, 220B are arranged to extend through inside leak sensor 300 and one of movable strips 210B is arranged to extend through overcurrent sensor 700, but in the case where two movable strips 210A, 210B are arranged to extend through inside leak sensor 300, one of two stationary strips 220A, 220B is preferably extended through inside leak sensor 700. Further the provision of test strip is allowable.

Advantages brought about by the present invention are as follows:

The inventive connector with breaking of current for a leak functions as instantaneous breaker at the moment that a leak occurs and includes connection means for connecting The route between a source and a load, leak detection sensor in the form of a ring through which the connection means extends, and breaker means for breaking the connection between the source and the load in response to a leak, wherein connection means and breaker means are stored in an assembly box and the leak sensor means is stored in an attached compartment under the assembly box. The breaker means includes a coil which will be excited in response to a detection of a leak, and an actuator which will displace according to the excitement of the coil, and the connection means includes a paired movable strips and a paired stationary strips contactable to one of the movable ones, wherein either of movable pair or stationary pair, or one of the movable pair and one of the stationary pair which is other than contactable to the movable one are extended to run through the leak sensor, and the movable strips will disconnect or remove from the stationary strips according to displacement of the actuator.

An extension of the connector means is designed to run through the leak sensor and accordingly another wiring is dispensed with and as a whole the number of parts lessens. Further the leak sensor is mounted under the assembly box and accordingly a reduction in size is accomplished and in turn the implementation to a printed circuit board is accomplished.

In addition, a test strip to test normal operation of the breaker means is provided in connection with the movable strip and accordingly checking of a possible malfunction is feasible.

The movable strips are mounted to the assembly box and accordingly such a trouble is avoided as the movable strip may move unexpectedly to break the contact with the stationary strip while a leak is on.

The test strip is designed to move in a direction different from that for the movable strip's operation and accordingly manual actions acted on the test strip are hardly transferred to the movable strip. Thus the connection to the stationary one by an unexpected move of the movable strip and in turn a malfunction to disconnect between the source and the load is avoided.

As for the connection means for extending through the leak sensor, two extensions from the connection means may be either of the movable or stationary pair, or one of movable pair and one of the stationary pair which is uncontactable to the same movable one, and thus choice of the strips is allowed in view of shape of the assembly box as well as placement of leak sensor so as to realize the compaction.

In other configurations, in addition to the leak sensor, an overcurrent sensor is fitted under the assembly box wherein either of the movable strips or stationary strips is extended to run through the overcurrent sensor. This arrangement contributes to avoid an increase in the number of parts and size enlargement while function of the overcurrent breaker is added.

A discharge gap is created between joints of the two movable strips or between parallel parts of the stationary strips by modifying such parallel parts closer or mounting a grounding strip anew in a close proximity to the downward part of one movable strip or to one stationary strip. Such device against possible lightening surge or noise is realized with avoidance in an increase in the number of parts.

What is claimed is:

1. A connector with breaking of current for leak, comprising:

a connection means for connecting a source and a load;

a leak current detection means including a circular, ring-shaped sensor which receives an extension of the connection means;

a breaker means for breaking current between the source and the load in response to a leak detection; and an assembly box which stores the connection means, the leak current detection means, and the breaker means, the leak current detection means being attached to a portion of the assembly box which is open to the outside of the assembly box, the breaker means including a coil to be excited in response to a leak current by the leak current detection means, and an actuator to displace in response to excitement of the coil, wherein the connection means includes a pair of movable strips each contactable with a corresponding one of a pair of stationary strips; and either of the paired movable strips or the paired stationary strips, or one movable strip and one stationary strip not contactable to the one movable strip are extended to run through the leak current detection sensor, and both of the movable strips disconnect from the stationary strips in response to displacement of the actuator.

2. A connector with breaking of current for leaks as claimed in claim 1, wherein one of the movable strips is provided with a test strip to test if the breaker means operates normally.

3. A connector with breaking of current for leak as claimed in claim 1 or 2, wherein the movable strips are mounted on the assembly box.

4. A connector with breaking of current for leak as claimed in claim 2, wherein the test strip moves in a direction different from that for the movable strips.

5. A connector with breaking of current for leak as claimed in claim 1, wherein the movable strips extend through the leak current detection sensor.

6. A connector with breaking of current for leak as claimed in claim 1, wherein the stationary strips extend through the leak current detection sensor.

7. A connector with breaking of current for leak as claimed in claim 1, wherein one movable strip and one stationary strip not contactable to the one movable strip extend through the leak current detection sensor.

8. A connector with breaking of current for leak as claimed in any of claims 1, 2, 5, 6 or 7, wherein the connector includes the leak current detection sensor and an overcurrent detection sensor which is attached under the assembly box to a portion which is open to the outside of the assembly box and either of the movable strips or stationary strips extend through the overcurrent detection sensor.

9. A connector with breaking of current for leak as claimed in claim 8, wherein the movable strips extend through the leak current detection sensor and the stationary strips extend through the overcurrent detection sensor.

10. A connector with breaking of current for leak as claimed in claim 8, wherein the stationary strips extend through the leak current detection sensor and the movable strips extend through the overcurrent detection sensor.

11. A connector with breaking of current for leak as claimed in any of claims 1, 2, 5, 6 or 7, wherein the movable strips and the stationary strips are made to form a parallel part facing each other in close proximity to act as a discharge gap.

12. A connector with breaking of current for leak as claimed in any of claims 1, 2, 5, 6 or 7, wherein a grounding strip is mounted in close proximity to downward extending parts of either of the movable strips or stationary strips to act as a discharge gap.

* * * * *